F. SPALDING.
MICROMETER CALIPER.
APPLICATION FILED NOV. 4, 1912.
1,107,187. Patented Aug. 11, 1914.
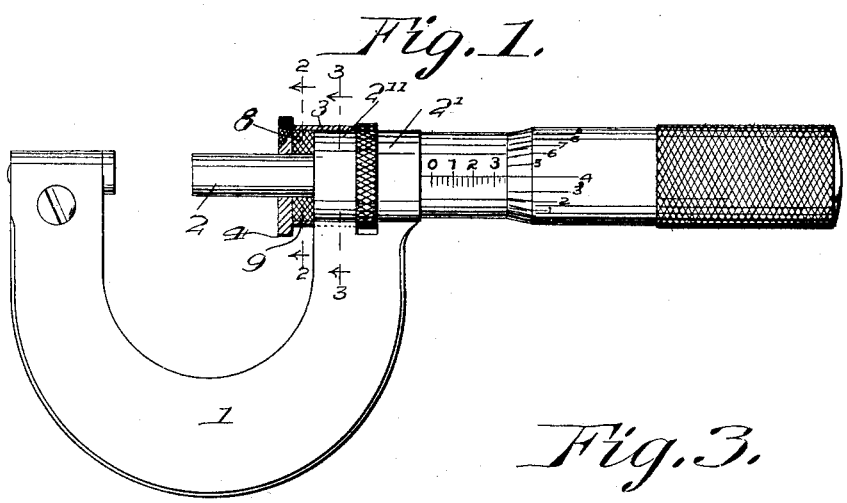
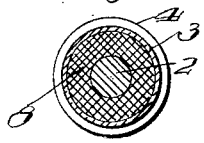
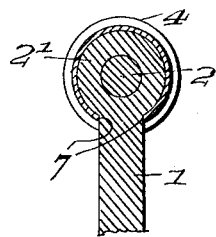
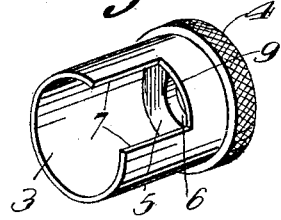
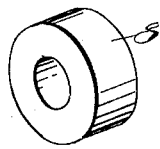

UNITED STATES PATENT OFFICE.

FRANK SPALDING, OF PROVIDENCE, RHODE ISLAND, ASSIGNOR TO BROWN & SHARPE MANUFACTURING COMPANY, OF PROVIDENCE, RHODE ISLAND, A CORPORATION OF RHODE ISLAND.

MICROMETER-CALIPER.

1,107,187.  Specification of Letters Patent.  Patented Aug. 11, 1914.

Application filed November 4, 1912. Serial No. 729,286.

*To all whom it may concern:*

Be it known that I, FRANK SPALDING, a citizen of the United States, residing at Providence, in the county of Providence and State of Rhode Island, have invented a new and useful Improvement in Micrometer-Calipers, of which the following is a specification.

This invention relates to certain new and useful improvements in micrometer calipers, and pertains more particularly to a guard which is attached to the spindle and which abuts the inner side face of the inner arm of the yoke, so as to form a tight joint, preventing the oil and grit on the spindle from entering the bearing. In some cases oil and grit on the work are thrown upon the spindle. The latter is objectionable, as the oil and grit will gradually enter the bearing, cutting the same until the perfect accuracy of the bearing is destroyed.

The present invention has for its object a guard which will effectually eliminate the entrance of oil or grit from the work to the micrometer, so as to assure perfect measurements in the use of the micrometer.

Further, the invention aims to provide a guard which can be easily applied and removed, and one which is effectual in preventing the entrance of oil or grit.

Still further, the invention aims to provide a guard of simple and economical construction, which will also allow the packing to be easily renewed, when necessary.

In the drawings: Figure 1 is a side elevation of a micrometer caliper equipped with the present invention, the guard being shown in cross section. Fig. 2 is a section on the line 2—2 of Fig. 1. Fig. 3 is a section on the line 3—3 of Fig. 1. Fig. 4 is a perspective view of the guard, and Fig. 5 is a similar view of the packing.

The present invention does not concern the micrometer construction itself, and consequently the latter will not be described in detail, other than to refer to the usual yoke 1, and the spindle 2, the latter having a rounded head 2' in connection with which elements the present invention is employed.

The guard consists of a sleeve 3 which has an annular flange or head 4 formed on its outer end, the periphery of which flange or head is knurled or otherwise roughened so as to provide an effective finger engaging surface, to allow of ready and easy application and removal of the guard with relation to the spindle, and to receive the latter the guard has its end wall 5 provided with an opening 6 centrally located and formed to snugly receive the spindle. The sleeve 3 is cut-away at 7 so as to receive and snugly engage the sides of the inner arm of the yoke 1, by which means the guard will be held against any rotary movement. The cut-away portion 7 extends through the inner end of the sleeve and terminates at a point in spaced relation to the end wall 5 so as to provide space to receive a packing ring 8. The packing ring engages over the spindle 2 and is caused to tightly impinge against the inner side face of the inner arm of the yoke, as depicted in Fig. 1 of the drawings. The end wall 9 formed by the cut-away portion abuts the inner side face of the inner arm of the yoke, and the free or inner end of the sleeve is caused to engage the member 2'' of the micrometer.

In operation, the packing ring is placed in the guard so as to abut the end wall 5 of the same, and the guard is then placed on the spindle so that the latter passes through the opening of the packing ring and the opening 6 of the end wall of the guard, whereupon the entire structure is moved so that the sleeve 3 frictionally engages with the rounded portion 2'' of the yoke 1, and the packing is compressed between the end wall 5 of the guard and the inner side face of the inner arm of the yoke, the stated movement causing the end wall 9 of the guard formed by the cut-away portion 7 to abut said inner side face of the inner arm of the yoke. From the above it will be evident that oil or grit carried on the spindle is effectually prevented from entering the bearing.

Having thus described my invention, I claim as new and desire to secure by Letters Patent;—

1. In combination with a micrometer having a yoke and a rounded portion at one end of the yoke, a guard composed of a sleeve of cylindrical outline having a cut-out part on its periphery which extends from a point in spaced relation to one end of the sleeve through the opposite end thereof, said cut-out portion forming side walls the edges of which are for direct engagement with the opposite sides of the yoke at the base of the rounded portion thereof, the first named end of the sleeve having a perforated wall, and a packing ring on the interior of the sleeve abutting the end wall, the micrometer spindle being received in the packing ring and the perforation of the end wall, and the packing ring abutting the inner side of the yoke.

2. In combination with the spindle and the spindle head and the arm of a micrometer calipers, a guard composed of a sleeve having an end wall, an annular knurled head on the end of the sleeve adjacent said end wall and projecting beyond the sleeve periphery, said end wall of the sleeve being perforated to receive the spindle, the periphery of the sleeve having a cut-out part which receives the arm of the calipers, and a packing ring abutting the end wall of the sleeve and also the inner face of one end of the arm, the free end edge of the sleeve being disposed in close proximity to said spindle head.

In testimony whereof I have signed my name to this specification in the presence of two subscribing witnesses.

FRANK SPALDING.

Witnesses:
ADA E. HAGERTY,
J. A. MILLER.

Copies of this patent may be obtained for five cents each, by addressing the "Commissioner of Patents, Washington, D. C."